United States Patent [19]
Wirth et al.

[11] Patent Number: 6,062,192
[45] Date of Patent: May 16, 2000

[54] INTERNAL COMBUSTION ENGINE WITH SPARK IGNITION

[75] Inventors: Martin Wirth; Walter Piock, both of Hitzendorf, Austria

[73] Assignee: AVL List GmbH, Graz, Austria

[21] Appl. No.: 09/173,658

[22] Filed: Oct. 16, 1998

[30] Foreign Application Priority Data

Oct. 16, 1997 [AT] Austria ................................. 640/97 U

[51] Int. Cl.$^7$ .............................. F02B 17/00; F02B 23/00
[52] U.S. Cl. ......................... 123/295; 123/298; 123/301; 123/302
[58] Field of Search ................................ 123/193.6, 295, 123/298, 301, 302, 305, 307, 308

[56] References Cited

U.S. PATENT DOCUMENTS

| 2,600,440 | 6/1952 | Smith | 123/307 |
| 4,166,436 | 9/1979 | Yamakawa | 123/262 |

FOREIGN PATENT DOCUMENTS

| 1926613 | 11/1970 | Germany . | |
| 07102976 | 4/1995 | Japan . | |
| 394647 | 1/1933 | United Kingdom | 123/302 |
| 9219852 | 11/1992 | WIPO . | |

*Primary Examiner*—Tony M. Argenbright
*Attorney, Agent, or Firm*—Watson Cole Grindle Watson, P.L.L.C.

[57] ABSTRACT

In an internal combustion engine with spark ignition and one or more reciprocating pistons, with an ignition device positioned in a roof-shaped top face of the combustion chamber and at least one fuel delivery device for each cylinder for direct fuel delivery essentially in the direction of the ignition device, and with at least one intake port configured so as to generate a swirl movement, the piston exhibits an asymmetrically shaped piston recess whose walls are configured as arcuate flow guiding faces assisting the swirl movement of the cylinder charge. To obtain reliable ignition of the directly introduced fuel on the one hand and maximum liberty in designing the engine on the other hand, the proposal is put forward that the piston recess between opposite walls should essentially constitute an open channel of meander-shaped or S-shaped configuration in plan view, at least one end of the channel forming an inlet area into the recess, which starts at the piston rim.

13 Claims, 5 Drawing Sheets

INTERNAL COMBUSTION ENGINE WITH SPARK IGNITION

BACKGROUND OF THE INVENTION

This invention relates to an internal combustion engine with spark ignition and at least one reciprocating piston, with an ignition device positioned in a roof-shaped top face of the combustion chamber, and at least one fuel delivery device per cylinder for direct fuel delivery essentially in the direction of the ignition device, and with at least one intake port configured so as to generate a swirl movement, the piston featuring an asymmetrically shaped piston recess whose walls are configured as arcuate flow guiding faces assisting the swirl movement of the cylinder charge.

DESCRIPTION OF THE PRIOR ART

Ever stricter demands on fuel consumption and exhaust emissions, in particular the reduction of hydrocarbon emission, necessitate the use of new technologies for internal combustion engines. With modern systems of external mixture formation employed in engines of the spark-ignition type, such as injection by means of a suction pipe or the use of a carburetor, part of the mixture admitted into the combustion chamber and cylinder flows into the exhaust passage of the engine during the phase of valve overlap, i.e., when intake and exhaust valve are open simultaneously. Besides, a considerable percentage of the unburnt hydrocarbons found in the exhaust passage originates from parts of the mixture coming from annular gaps or wall areas where no combustion occurs. An additional point is the need for rendering the cylinder charge homogeneous, at an approximately stoichiometric fuel-air ratio, to ensure reliable combustion without misfiring. For this purpose the engine load must be controlled with the use of a throttling device checking the total volume of the admitted mixture (quantity control).

Such throttling of the intake flow leads to a thermodynamic loss, which will increase fuel consumption of the engine. If this kind of throttling is avoided, potential fuel savings amount to an estimated 20 percent.

To overcome or reduce the above problems numerous attempts have been made at an unthrottled operation of spark-ignition engines, where the fuel is introduced into the combustion chamber and cylinder or a mixing space directly adjacent thereto only after the air has been admitted, similar to a compression-ignition engine.

Basically, there are three systems of mixture formation: high-pressure injection of liquid fuel air-supported fuel injection introduction of a fuel-air mixture.

In SAE 780699 a method is described in which the fuel is directly injected into the engine combustion chamber by means of a high-pressure injection nozzle. The time required for preparation of the mixture puts a restriction on the minimum time interval between the moment of injection and the moment of ignition. The injection process demands a high level of pressure to obtain short injection times as well as satisfactory fuel atomization with a suitably small droplet spectrum. Fuel preparation and metering take place simultaneously. In order to concentrate the combustible fuel-air mixture within a locally confined region, however, it is essential that the fuel be introduced at a very late point in time of the engine cycle (if necessary, as late as during the compression phase immediately prior to ignition), to limit the time for propagation and dilution of the mixture in the air of the combustion chamber. The demands for an early injection ensuring complete evaporation of the fuel and a late injection in order to maintain mixture stratification thus are opposed to each other. For this reason further development efforts should attempt to reduce the characteristic time required for mixture preparation whilst increasing the characteristic time during which the desired mixture stratification is maintained.

In view of the above considerations the main task to be accomplished is to transform the injected fuel volume into a locally concentrated fuel-air spraycloud which is advanced from the nozzle of the injection device to the spark plug, and to further mix the mixture inside this cloud with the air in the combustion chamber. In this context the following points should be observed: The fuel-air spray should maintain its compact shape, especially at low engine loads, and should be kept in the center of the combustion chamber as far as possible, for thermodyamical reasons and in order to reduce the emissions of unburned hydrocarbons.

Mmixing of the injected fuel to obtain a mixture of preferably stoichiometric air ratio should be effected in the short time interval between injection moment and ignition moment.

At the spark plug a low mean flow velocity should prevail, together with a high level of turbulence, to promote iginition of the fuel-air cloud by the spark.

One main problem of this type of combustion is constituted by the cyclical fluctuations of the process of mixture formation, i.e., changes between engine cycles due to the turbulence of the flow processes in the intake system and cylinder of the internal combustion engine. To minimize such fluctuations a type of flow should be generated in the cylinder which features high stability and will retain its pattern, in particular during the compression phase of the engine cycle, without disintegrating into turbulent flow movements. This requirement is best fulfilled by a swirl flow.

The term swirl denotes a rotary motion in the cylinder about an axis that is substantially parallel to the cylinder axis, which motion is created by the design of the intake passage(s) and corresponding opening(s) into the combustion chamber and cylinder of the engine. During compression the flow pattern changes only slightly since the diameter of the vortex will not vary with the movement of the piston. In this way a stable rotary movement of the admitted air is provided in the combustion chamber and cylinder before the upper dead centre.

In EP 0 598 941 A1 a type of piston recess is disclosed which, if designed appropriately, will divert the flow of the swirl rotating about the cylinder axis in the direction of the cylinder axis during the compression phase. This is achieved by the kidney-type shape of the piston recess exhibiting two or three bays. The restricted portions of the sidewall between the concave parts of the recess will divert the swirl flow towards the centre of the cylinder as it enters the recess during the compression phase, such that the level of turbulence will increase significantly in the centre of the piston recess due to the collision of the streams located opposite of each other and directed towards the cylinder centre. With this kind of piston recess additional turbulence is produced due to flow detachment at the edges of the recess when the swirl flow enters the recess. At the same time a low mean flow velocity is obtained in the cylinder centre, in the vicinity of the preferably centrally positioned spark plug, on account of the rotation-symmetrical design.

In the above EP 0 598 941 A1 this production of turbulence is the only means of accelerating the combustion of lean mixtures and the evaporation of fuel films on the walls of the combustion chamber.

In EP 0 741 237 A1 the principle of the multiple-bay piston recess is employed in modified form with an internal combustion engine of the above-mentioned type. By a suitable configuration of the recess the swirl is divided upon entering the recess during the compression phase into partial swirls depending on the number of bays, which will lead to collisions of oppositely disposed streams and thus produce turbulence in the cylinder centre. When the main swirl is divided into individual partial swirls the rotational speed will increase due to the reduction in swirl diameter (conservation of torque), thus strengthening the influence of the flow movement on the injected fuel cloud.

In the instance of low engine loads and small mixture volumes, which require increased air/mixture stratification in the combustion chamber, the mixture preferably is introduced at a very late point in time of the compression phase, when the largest part of the cylinder charge has reached the piston recess. This implies that the transformed flow movement generated by the piston recess will constitute the main flow form prevailing in the volume of the combustion chamber. The injection device is positioned such that the injected fuel jet, which departs from a nozzle position eccentric to the cylinder axis, will arrive in the combustion chamber so as to be directed towards the cylinder axis. The position of the injection device relative to the piston recess is set such that fuel injection will take place only into one of the two partial swirls formed in the recess. The spark plug is positioned at the centre of the combustion chamber.

With this type of fuel injection two aims are pursued:
(1) As the two partial swirls represent stable flow structures and the gas exchange occurring at the center of the combustion chamber between the two partial swirls is quite small despite the turbulence produced in the area, the air volume contributing to further dilution of the mixture will be reduced.
(2) Parts of the preferably conical injection jet as well as the peripheral regions of a spraycloud inside a partial swirl are advanced to the zone of increased turbulence developing at the center of the combustion chamber. This will accelerate preparation of the mixture injected at a strongly sub-stoichimetric ratio, thus yielding an ignitible, preferably stoichimetric mixture in the immediate vicinity of the spark plug positioned approximately at the center of the combustion chamber, whilst ensuring favorable conditions for ignition (increased turbulence, low mean velocity). In this way all demands pertaining to the desired combustion process are fulfilled:
The injected mixture is confined in a partial swirl to form a locally concentrated, stable fuel-air cloud. In the zone of increased turbulence production at the center of the combustion chamber accelerated mixture preparation will take place to obtain an ignitible mixture.
In the area of the centrally positioned spark plug low mean velocity and high turbulence intensity will prevail, due to the flow being symmetric relative to the cylinder center, which will enhanced inflammation of the mixture.

The design of the combustion chamber shown in EP 0 741 237 A1 is particularly well suited for internal combustion engines with four valves and one central ignition device per cylinder, where direct fuel injection takes place in an area in the middle between periphery and centre of the combustion chamber.

SUMMARY OF THE INVENTION

It is an object of this invention to improve an internal combustion engine as described in the initial paragraph, and to provide greater freedom of construction in positioning the fuel delivery device while at least maintaining the advantages described.

According to the invention this object is achieved by configuring the piston recess between opposite recess walls substantially as an open channel that is meander-shaped or S-shaped in plan view, at least one end of the channel forming a recess inlet area starting at the piston rim. During the intake phase of the engine the at least one swirl-generating intake port will produce a swirl movement about the longitudinal axis of the cylinder. During the compression phase the swirl is divided as it enters the piston recess into two partial swirls rotating in the same direction, which are directed towards the centre of the combustion chamber by the walls of the channel-type piston recess. During the compression phase fuel is injected or blown into at least one partial swirl by means of a laterally positioned fuel delivery device. The injected mixture is confined by the partial swirls so as to form a locally concentrated fuel-air cloud. By designing the combustion chamber as proposed by the invention, a zone of increased turbulence production is established at the centre of the combustion chamber, which will accelerate preparation of the fuel-air cloud to produce an ignitible mixture. In the vicinity of the ignition device, which is centrally positioned above the piston recess, for example, the mean flow velocity is comparatively low on account of the flow being directed towards the centre of the combustion chamber, while turbulence intensity is high, which will enhance inflammation of the mixture.

It is proposed in a preferred variant that each channel end of the piston recess be configured as a preferably flat inlet area, the first inlet area being positioned on the intake side and the second inlet area on the exhaust side.

To further improve the guiding of the partial swirls it is provided that the first inlet area of the piston recess be followed by a first concave section of the recess wall, which intersects at a preferably sharp edge with a second convex wall section departing from the second inlet area, and that the first inlet area be followed by a first convex wall section placed at a distance from the first concave wall section, which first convex wall section intersects at another edge with a second concave wall section adjacent to the second inlet area of the recess.

It is proposed in a specially preferred variant of the invention that the first concave recess wall section should have a larger radius of curvature than the second concave recess wall section, the curvature radius of the first concave recess wall section preferably amounting to one third to two thirds of the piston radius and the curvature radius of the second concave recess wall section to preferably one fourth to one half of the piston radius.

For improved guiding of the partial swirls it is proposed that the recess walls, or at least parts thereof, should be essentially parallel to the piston axis in at least one concave section. Another proposal is that the recess walls, or at least parts thereof, should be configured so as to lean inwardly in at least one concave section. Flow guiding is greatly improved by providing that the recess walls, or at least parts thereof, form an obtuse angle with the bottom of the recess, in at least one convex wall section. In this way flow detachment may be avoided in this area.

Another preferred variant of the invention proposes that the rim of the recess, or at least parts therof, should be constituted by a projection on the top face of the piston, and that it should project at least partly beyond a reference plane defined by the outer edge of the piston. In this way the swirl flow is directed into the channel-type piston recess by means of the piston top face acting as a squish area outside of the piston recess. This effect is further improved by providing that the projection should conform, at least in parts, to the roof-shaped bounding face of the combustion chamber.

In order to prevent undesired turbulences due to flow detachment upon entrance of the piston recess, it is proposed that the piston recess flatten out towards the piston rim in at least one inlet area.

To ensure concentration of the fuel mixture near the preferably centrally positioned ignition device, it is proposed that the plane centre of gravity of the piston recess be in the area of the piston axis.

A high flow velocity upon entering the piston recess will improve fuel atomization and rapidly advance the mixture towards the spark plug. For this purpose the proposal is put forward that the width of the piston recess, defined by the distance between two opposite recess walls, should be smallest in the recess inlet area.

BRIEF DESCRIPTION OF THE DRAWINGS

The invention will now br further described with reference to the accompanying drawings, in which.

Parts with the same functions have the same reference numbers in all variants.

DESCRIPTION OF PREFERRED EMBODIMENTS

Figure 1:
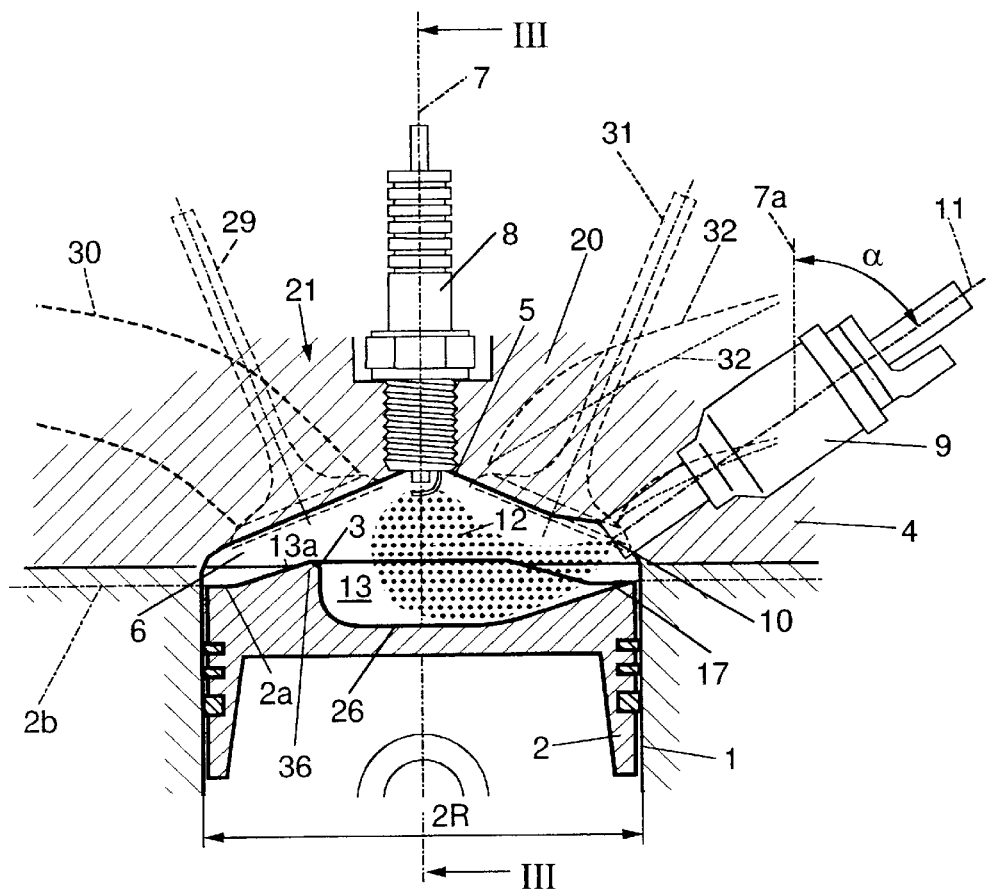
FIG. 1 shows the internal combustion engine proposed by the invention in a logitudinal section along line I—I in FIGS. 2 and 3.

In a cylinder 1 is positioned a reciprocating piston 2. The top surface 3 of the piston 2 and the roof-shaped top face 5 of the combustion space in the cylinder head 4 form a combustion chamber 6, into which extends an ignition device 8. The nozzle 10 of a fuel delivery device 9 is situated at the periphery of the combustion chamber 6. The longitudinal axis of the fuel delivery device 9 is referred to as 11, the angle α between the longitudinal axis 11 and a parallel line 7a to the piston axis 7 is about 40° to 75°. The fuel delivery device 9 is positioned such that an injected fuel jet 12 is directed substantially towards the ignition device 8, and that this fuel jet 12 will arrive at the piston top surface 3 in proximity of the piston recess 13 in the upper dead centre of the piston 2. The ignition device 8 entering the combustion chamber 6 above the piston recess 13, may be positioned next to the piston axis 7 or at a distance therefrom. In plan view the piston recess 13 has a meander-shaped or S-shaped configuration, the two recess walls 14, 15, which are situated opposite of each other and substantially lead in the same direction, defining an open channel or groove whose beginning and end are designed as inlet areas 16a, 16b. In each of these inlet areas 16a, 16b the piston recess 13 flattens out towards the piston rim 17. In this way a flat entrance area is obtained for the partial swirls flowing into the piston recess 13, which are indicated by arrows 18 and 19.

The recess inlets 16a, 16b are situated on opposite sides of the piston 2. The first inlet 16a is on the intake side 20, the second inlet 16b on the exhaust side 21. Departing from the first inlet 16a is a first concave wall section 22a, which extends to the exhaust side 21 and ends in an edge 24. In this edge 24 the first concave wall section 22a intersects with a second convex wall section departing from the second inlet 16b.

Departing from the first inlet 16a, i.e., at a distance from the first concave wall section 22a corresponding to the channel width b, is a first convex wall section 23a, which intersects in another edge 25 with a second concave wall section 22b adjacent to the second inlet area 16b. The curvature radius $r_1$ of the first concave wall section 22a preferably is greater than the curvature radius $r_2$ of the second concave wall section 22b. The curvature radius $r_1$ preferably is one third to two thirds of the piston radius R. The curvature radius $r_2$ may be one fourth to one half of the piston radius R. As a consequence, the width b of the piston recess 13 defined by the distance between the recess walls 14, 15, is smaller in the inlet areas 16a, 16b than in the recess centre in proximity of the ignition device 8, towards which the injection jet is directed. The plane centre of gravity F of the piston recess 13 preferably is situated in the area of the piston axis 7.

It is essential to prevent flow detachment in the flow entrance area of the piston recess 13 in order to avoid undesirable turbulences. On the other hand, the swirl flow should be reliably directed towards the centre of the piston recess. To meet this requirement it will be an advantage to make the concave wall sections 22a, 22b of the recess as steep as possible, i.e., substantially parallel to the piston axis 7. The concave wall sections 22a, 22b could even be designed to lean inwardly in order to further improve flow guidance. On the other hand the convex sections 23a and 23b of recess walls 14, 15 may be flat, forming an obtuse angle with the bottom 26 of the recess 13. In this way it will be possible to prevent any turbulences of the partial swirls 18, 19 which are pushed over the convex wall sections 23a, 23b of the recess by the squish areas 27, 28 of the top surface 3 of the piston 2. For the same reason the inlet areas 16a, 16b, where the piston recess 13 meets the piston rim 17, are made as flat as possible.

The contour of the top surface 3 of the piston 2 conforms at least partly to the roof-shaped top face 5 of the combustion chamber 6, including at least one projection 36 projecting beyond a reference plane 2b defined by the outer edge 2a of the piston 2. The rim 13a of the piston recess 13 is constituted at least partly by the projection 36.

It has been found that the design of the piston as proposed by the invention will offer considerable freedom of construction as regards the positioning of the fuel delivery device 9, the number of intake and exhaust valves 31, 29 and intake ports 32.

Figure 2:
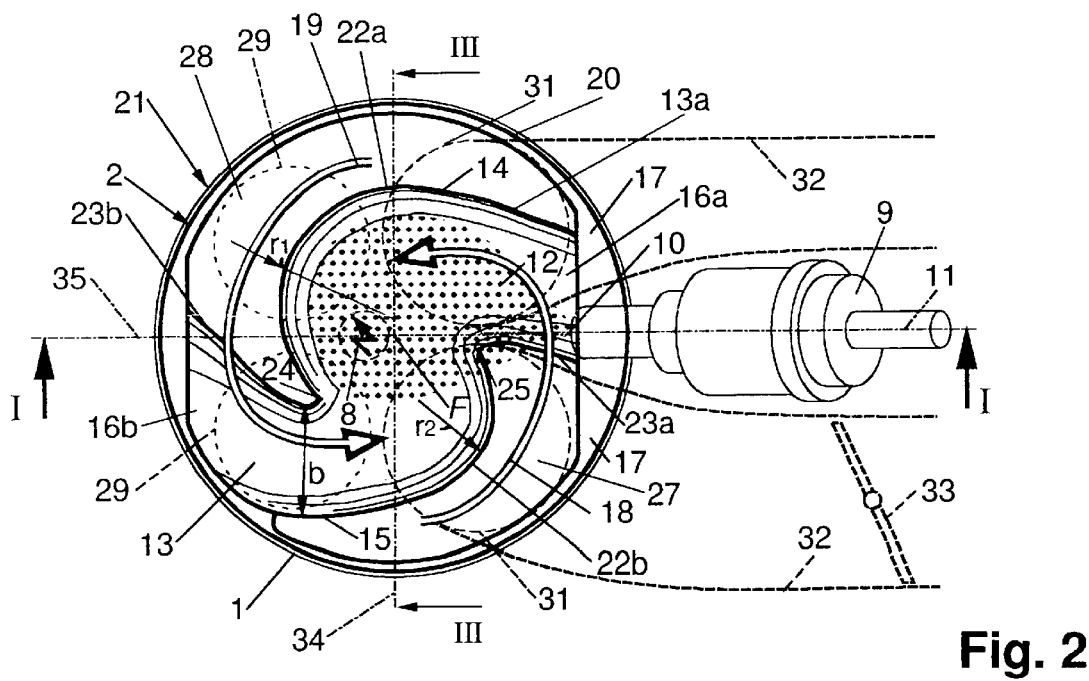
FIG. 2 is a plan view of the piston of the internal combustion engine shown in FIG. 1.
Figure 3:
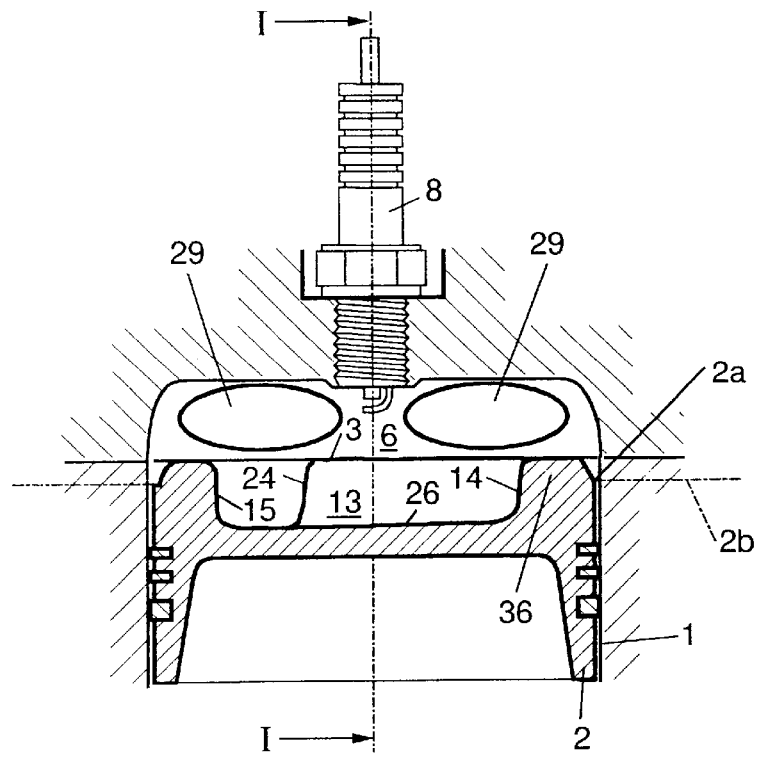
FIG. 3 is a longitudinal section along the line III—III in FIGS. 1 and 2.
Figure 5:
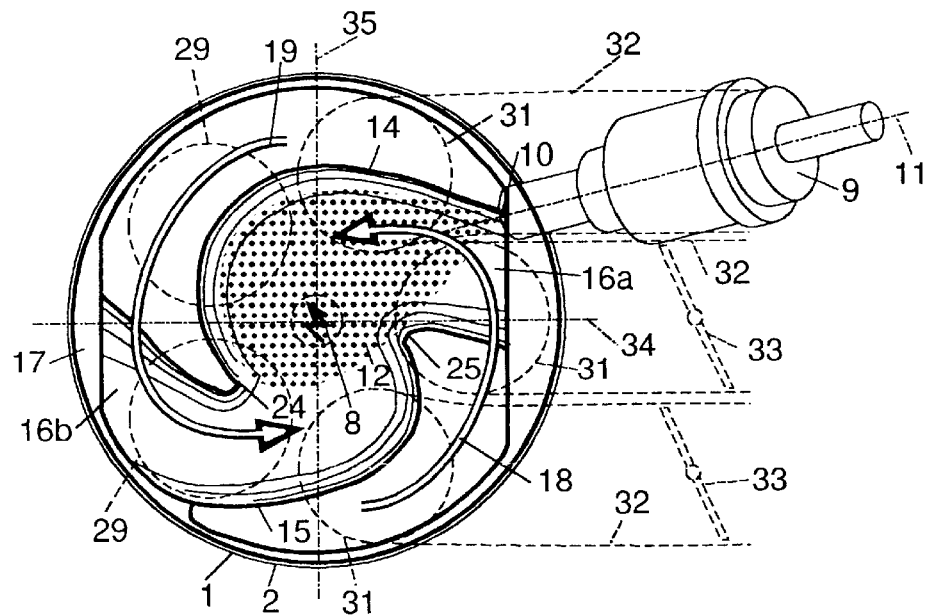
FIGS. 5 and 6 show further variants of the internal combustion engine of the invention with three intake valves and two exhaust valves.
Figure 7:
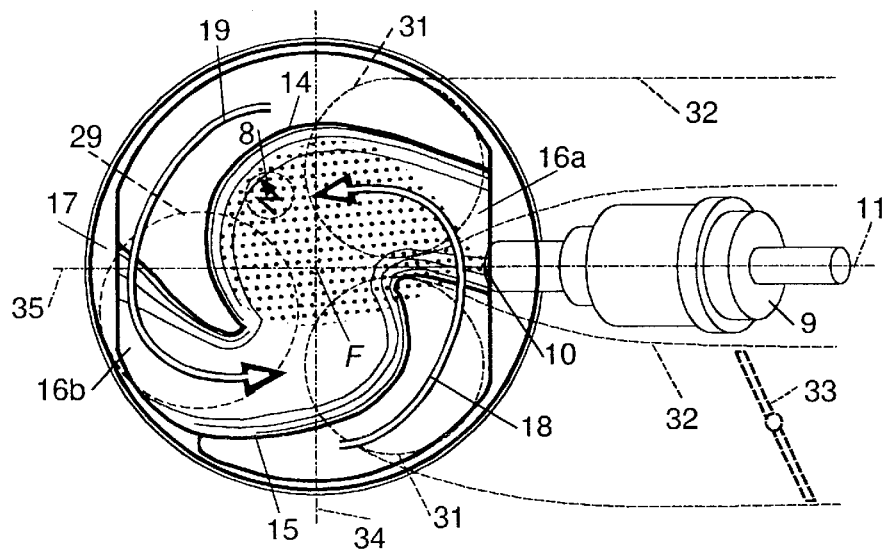
FIGS. 7 and 8 shows variants of the internal combustion engine of the invention, with two intake valves and one exhaust valve.

FIGS. 1 to 3, for example, represent an engine with two exhaust valves 29 and exhaust ports 30 as well as two intake valves 31 and two intake ports 32, the fuel delivery device 9 being positioned between the two intake ports 32. The same design may be employed with a variant with two exhaust valves 29 and three intake valves 31, as shown in FIG. 5, or with one exhaust valve 29 and two intake valves 31, as shown in FIG. 7. In these instances the nozzle 10 of the fuel injection device 9 is positioned between two intake ports 32 in plan view.

Figure 4:
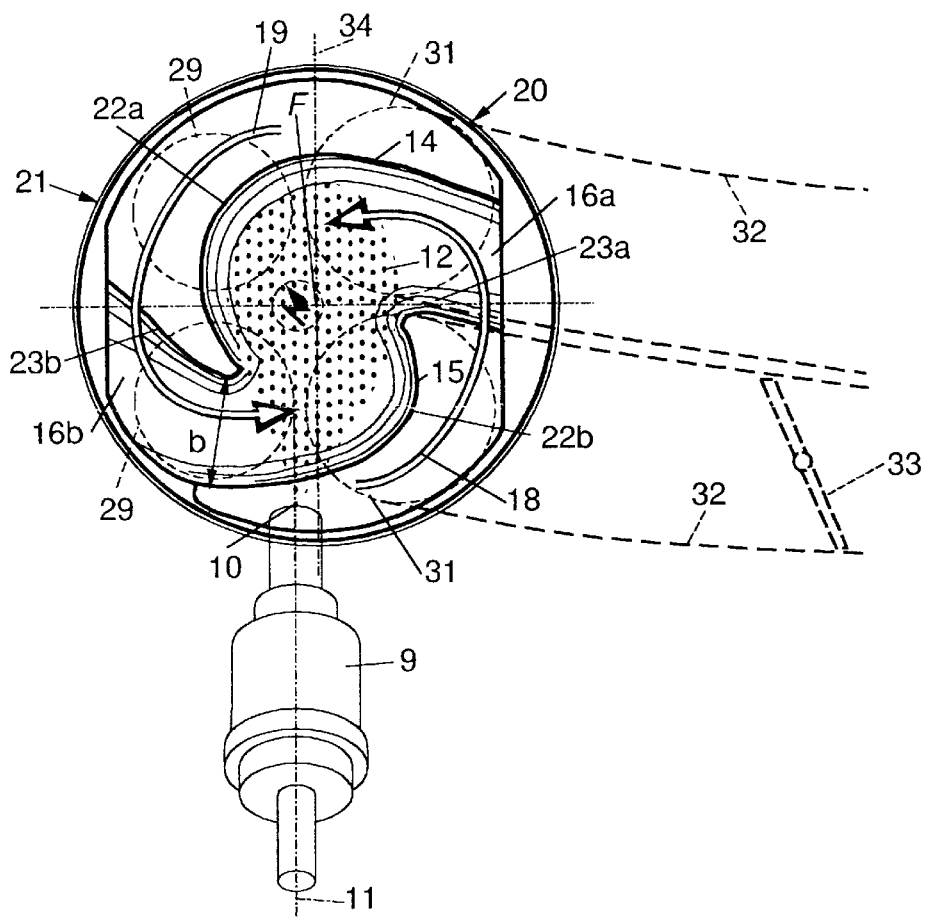
FIG. 4 shows a variant of the internal combustion engine of the invention with two intake valves and two exhaust valves.
Figure 6:
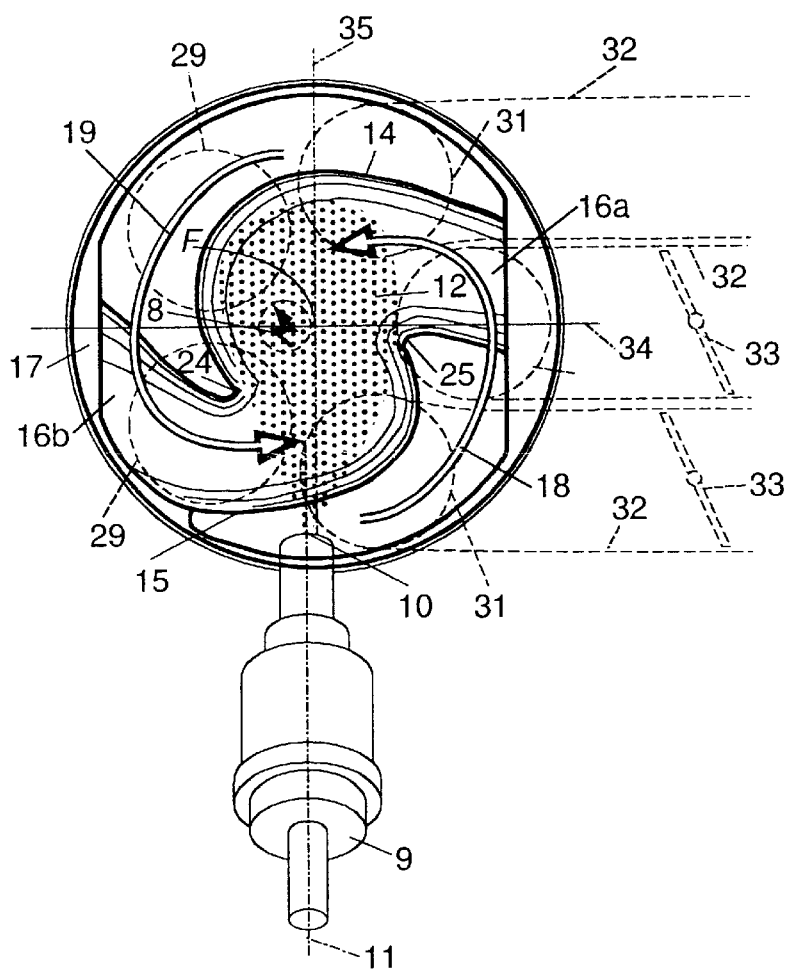
Figure 8:
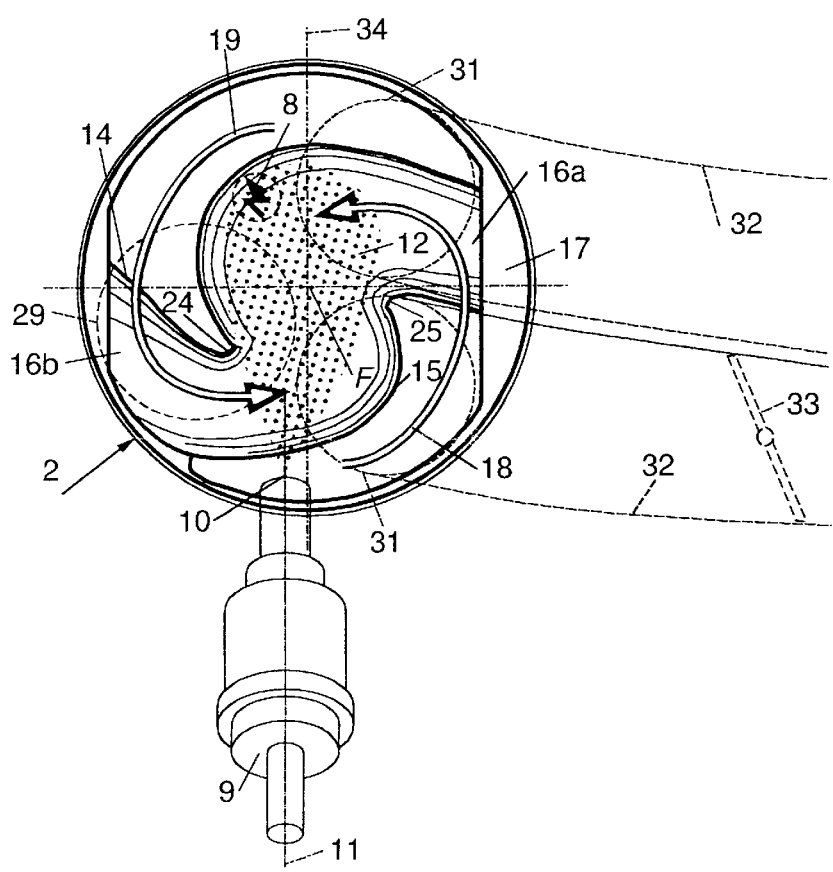

FIGS. 4, 6, and 8 present variants with four, five and three valves 29, 31, where the fuel injection device 9 is positioned essentially transversely to the intake ports 32, i.e., in the longitudinal plane 34 of the engine.

Figure 9:
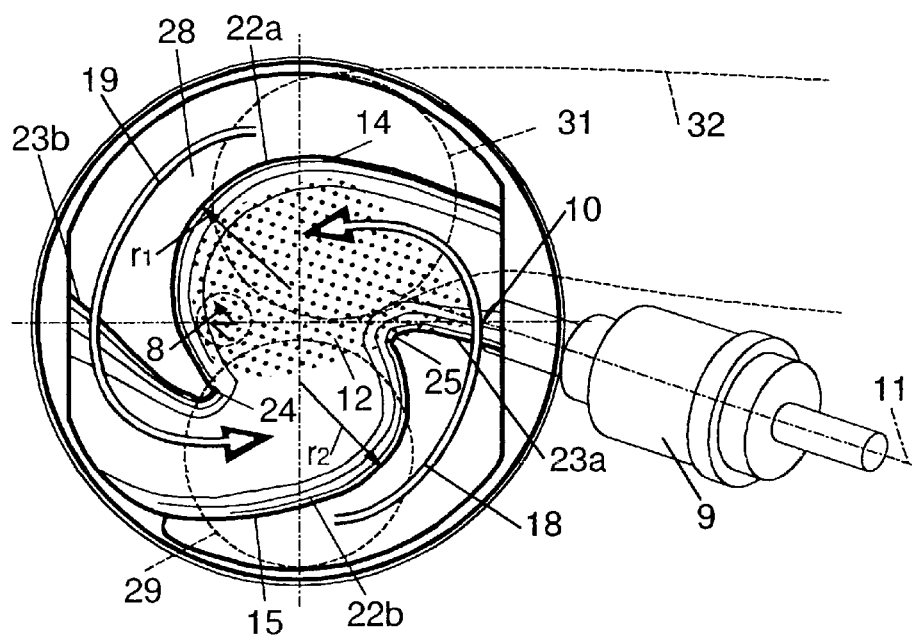
FIG. 9 shows a variant of the internal combustion engine of the invention with one intake valve and one exhaust valve.

FIG. 9 presents a variant with one exhaust valve 29 and one intake valve 31, where the nozzle 10 of the fuel injection device 9 is positioned in the transverse plane 35 normal to the longitudinal plane 34 of the engine.

In any case the partial swirls 18, 19 produced by the fuel jet 12 will assist in maintaining a compact fuel-air cloud and advancing it towards the ignition device 8 in order to ensure reliable ignition.

We claim:

1. An internal combustion engine with spark ignition and at least one reciprocating piston having a piston axis, comprising:

an ignition device positioned in a roof-shaped top face of a combustion chamber, at least one fuel delivery device per cylinder for direct fuel delivery essentially in the direction of the ignition device, and at least one intake port configured so as to generate a swirl movement, the piston featuring an asymmetrically shaped piston recess whose walls are configured as arcuate flow guiding faces assisting the swirl movement of a cylinder charge, wherein the piston recess between opposite recess walls is configured essentially as an open channel that is meander-shaped or S-shaped in plan view, at least one end of the channel forming a recess inlet area starting at a piston rim.

2. An internal combustion engine according to claim 1, wherein each channel end of the piston recess is configured as a flat recess inlet area, the first inlet area being positioned on the intake side and the second inlet area on the exhaust side.

3. An internal combustion engine according to claim 2, wherein the first recess inlet area is followed by a first concave recess wall section, which intersects at a sharp edge with a second convex recess wall section departing from the second inlet area, and wherein the first inlet area is followed by a first convex recess wall section placed at a distance from the first concave recess wall section, which first convex wall section intersects at another edge with a second concave wall section adjacent to the second inlet area of the recess.

4. An internal combustion engine according to claim 3, wherein the first concave recess wall section has a larger curvature radius than the second concave recess wall section.

5. An internal combustion engine according to claim 4, wherein the curvature radius of the first concave recess wall section amounts to one third to two thirds of a piston radius, and the curvature radius ($r_2$) of the second concave recess wall section amounts to one fourth to one half of the piston radius.

6. An internal combustion engine according to claim 1, wherein the recess walls, or at least parts thereof, have at least one concave recess wall section and are essentially parallel to the piston axis in the at least one concave recess wall section.

7. An internal combustion engine according to claim 1, wherein the recess walls, or at least parts thereof, have at least one concave recess wall section and are configured so as to lean inwardly in the at least one concave recess wall section.

8. An internal combustion engine according to claim 1, wherein the asymmetrically shaped recess has a recess bottom, the recess walls, or at least parts thereof, have at least one convex recess wall section and form an obtuse angle with the recess bottom in the at least one convex recess wall section.

9. An internal combustion engine according to claim 1, wherein the recess rim is constituted, at least partially, by a projection on a top face of the piston, and wherein it projects at least partly beyond a reference plane defined by an outer edge of the piston.

10. An internal combustion engine according to claim 9, wherein the projection conforms, at least in parts, to the roof-shaped bounding face of the combustion chamber.

11. An internal combustion engine according to claim 1, wherein the piston recess flattens out towards the piston rim in at least one recess inlet area.

12. An internal combustion engine according to claim 1, wherein the plane centre of gravity of the piston recess is situated approximately in the area of the piston axis.

13. An internal combustion engine according to claim 1, wherein a width of the piston recess, defined by a distance between two opposite recess walls, is smallest in the area of the recess inlet.

* * * * *